United States Patent [19]

Tsuda

[11] Patent Number: 5,697,996
[45] Date of Patent: Dec. 16, 1997

[54] MOLD POSITIONING APPARATUS AND METHOD

[75] Inventor: Masahiro Tsuda, Funabashi, Japan

[73] Assignee: Asahi Glass Company Ltd., Tokyo, Japan

[21] Appl. No.: 678,733

[22] Filed: Jul. 11, 1996

[30] Foreign Application Priority Data

Jan. 24, 1996 [JP] Japan ................................. 8-010406

[51] Int. Cl.$^6$ ........................................ C03B 11/08
[52] U.S. Cl. ................ 65/29.14; 65/29.12; 65/29.18; 65/158; 65/160; 264/40.5; 425/150; 425/421
[58] Field of Search ................ 65/29.12, 29.14, 65/29.18, 158, 159, 160; 425/3, 150, 421; 264/40.1, 40.5

[56] References Cited

FOREIGN PATENT DOCUMENTS 7-215722  8/1995  Japan.

Primary Examiner—Donald E. Czaja
Assistant Examiner—Sean Vincent
Attorney, Agent, or Firm—Oblin, Spivak, McClelland, Maier & Neustadt, P.C.

[57] ABSTRACT

A mold positioning apparatus which is used in a pressing apparatus for pressing a work by a plunger and a bottom mold, comprising keys and key guides which are provided on a plunger and a bottom mold, and which are engaged together to restrict a relative position between the plunger and the bottom mold; means for shaking at least one of the plunger and the bottom mold in clearance between the key and the key guide while keeping the key and the key guide in engagement; means for measuring a movable range of the at least one of the plunger and the bottom mold during the shaking; a device for calculating a relative position between the key and the key guide and the relative position between the plunger and the bottom mold based on the measured movable range; and means for adjusting the plunger and the bottom mold in a range of the clearance of the key and the key guide based on the calculation to carry out positioning therebetween.

5 Claims, 5 Drawing Sheets

MOLD POSITIONING APPARATUS AND METHOD

BACKGROUND OF THE INVENTION

1. Field of the Invention

The present invention relates to an apparatus and a method to position mold halves in a pressing apparatus for pressing a work by the mold halves.

2. Discussion of Background

With regard to a process for pressing molten glass (a glass gob), a typical layout according to the prior art is shown in FIG. 4. It is schematically shown as viewed from above that bottom molds 12 for loading a glass gob therein are fixed on a rotation table 30. FIG. 5 shows typical examples of a pressing apparatus and mold halves which are used when the layout shown in FIG. 4 is used to form CRT panels.

As shown in FIGS. 4 and 5, the bottom molds 12, for example eight, are mounted on the rotation table 30 at equal intervals. When the rotation table 30 is clockwise rotated at 45° at a time, a gob 11 is supplied to a bottom mold 12 with a shell mold 14 fit thereon at the loading-position 31, and a plunger 13 is lowered at the pressing-position 32 to press the gob 11 in the bottom mold 12.

The positioning accuracy of bottom mold 12, the plunger 13 and the shell mold 14 at that time has been determined by the pressing position of the plunger 13, the stopping position of the rotation table 30, the mounting position of the bottom mold 12 to the rotation table 30, and the assembling accuracy of the bottom mold 12 and the shell mold 14. There has been known a method wherein the plunger 13, and the bottom mold 12 or the shell mold 14 have keys 16 and key guides 17 provided thereon, and the keys and the key guides are engaged to improve the positioning accuracy. Reference numeral 15 designates a press machine for raising and lowering the plunger 13.

When the conventional glass pressing apparatus shown in FIG. 5 is used to carry out such mold positioning, the following problems have been raised:

(a) Absence of the keys and the key guides on the mold creates disadvantages as follows. It is difficult to mount all bottom molds 12 on the rotation table 30 in a uniform manner and with the good positioning accuracy. Even if bottom molds have been mounted on the rotation table with the high accuracy at a relatively low temperature before starting the pressing operation, there are caused variations in the positions of the respective bottom molds 12 under the hot environment during the pressing operation. As a result, even if the position of the plunger 13 of the pressing apparatus is adjusted, there are variations in a range of about 0.1 mm in glass products formed by those bottom molds.

(b) Although the use of keys and key guides can decrease such variations in shaped glass products in comparison with non-use of keys and key guides, it is difficult to eliminate the variations. The reason is that certain clearance is required between keys 16 and key guides 17, and that the clearance causes variations in the size of the products. The extent of variations is determined by finishing accuracy of the key and the key guide, the mounting accuracy of keys and key guides to the mold, and the size of clearance. It is technically difficult that the finishing accuracy and the mounting accuracy of keys and key guides used on a mold for a big glass product is ensured to have an error less than the order of submilli meters under hot environment in terms of the capacity of the existing machine tools. The engagement of keys and key guides necessitates the presence of scrubbing portions, and keys and key guides are worn in use to degrade the positioning accuracy. Furthermore, metal powder which has been caused due to the wear could adhere to glass to make some product defects.

(c) Certain clearance is required between the plunger and the bottom mold. For example, in FIG. 5, the clearance 18 between the plunger 13 and the shell mold 14 is required to be determined so that the plunger 13 and the shell mold 14 are prevented from being damaged due to collision. If the clearance 18 is too wide, great pressing force squeezes molten glass out of the clearance. If the pressing force is decreased to avoid the squeezing-out, there is a problem in that forming by the mold becomes insufficient.

SUMMARY OF THE INVENTION

It is an object of the present invention to solve the problems stated earlier and to provide a mold positioning apparatus which is used in a pressing apparatus for pressing a work by a plunger and a bottom mold comprising keys and key guides which are engaged together to restrict the relative position between the plunger and the bottom mold; means for shaking (moving right and left, and back and forth) at least one of the plunger and the bottom mold in clearance between the key and the key guide while keeping keys and key guides in engagement; means for measuring the movable range of at least one of the plunger and the bottom mold during the shaking; a device for calculating a relative position between keys and key guides and the relative position between the plunger and the bottom mold based on the measured movable range; and means for adjusting the plunger and the bottom mold in a range of the clearance of the key and the key guide based on the calculation to carry out the positioning therebetween.

The present invention also provides a method for positioning a mold, which is applicable to a process to press and shape a work by the mold, comprising shaking at least one of mold halves to measure the movable range of the at least one of the mold halves moving in the clearance between keys and key guides while keeping keys and key guides in engagement, keys and key guides restricting the relative position between the mold halves; calculating an error in the relative position between the mold halves based on the measurement; and carrying out positioning between the mold halves so as to correct the error.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
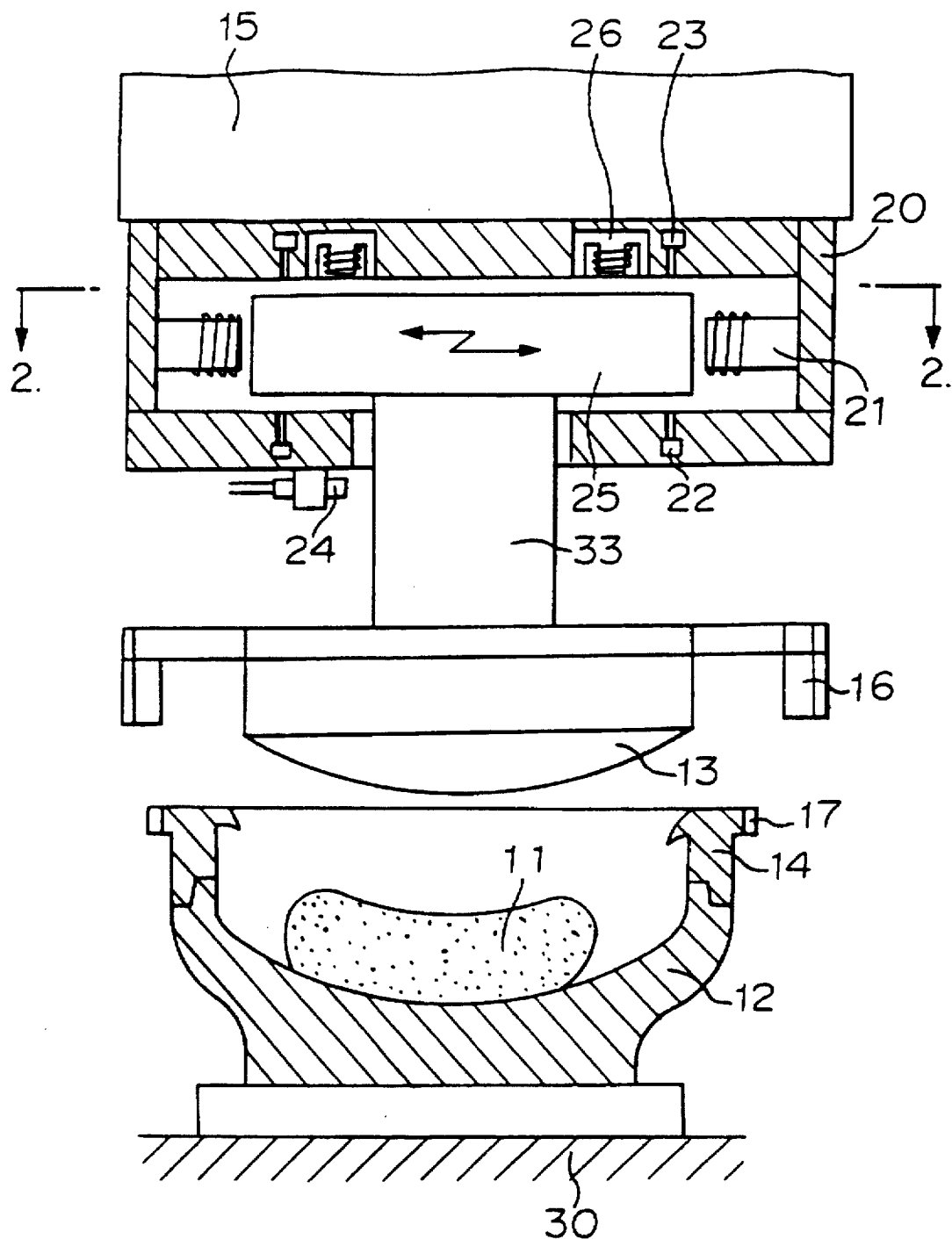
FIG. 1 is a sectional side elevation showing the structure of a pressing apparatus with a mold positioning apparatus according to the present invention incorporated therein.

In accordance with a mode of the present invention, the shaking means normally gives a lateral force to the plunger in a transverse direction or a horizontal direction, i.e. applies the shaking force to the plunger from various sides to shake it right and left, back and forth, and other directions, while the keys and the key guides provided on the plunger and the bottom mold are engaged together. Although the bottom mold is fixed, the plunger is supported with three degrees of freedom of motion in the horizontal direction. The plunger is supported by an elastic member, air or electromagnetic force in order to minimize resistance to facilitate movement when the shaking force is applied.

With regard to the way to give the shaking force to at least one of the plunger and the bottom mold, it is preferable to use electromagnetic force, pneumatic pressure, hydraulic pressure and the like from the viewpoint that the at least one of the plunger and the bottom mold can be shaked with high precision and at high speed, and that mechanical deterioration due to wear can be minimized. Such shaking force is applied to the plunger in the horizontal direction while the keys provided on e.g the plunger are engaged with the key guides provided on e.g. the bottom mold. When the shaking force is applied, the plunger moves in the range of the clearance between the keys and the key guides because the plunger is substantially restrained by the keys and the key guides. The plunger can not move freely beyond the range of the clearance. In the present invention, the bottom mold is normally fixed, and a shaked mold half is normally the plunger as stated just above. However, the manner to mount the bottom mold may be contrived so as to shake the bottom mold or both of the plunger and the bottom mold.

With regard to the means for measuring the movable range of the at least one of the plunger and the bottom mold during the shaking, e.g. linear scales, encoders, or non-contact displacement sensors can be used. Among them, the laser type, the eddy current type or the capacitance type of non-contact displacement sensors are appropriate in terms of operability, and easy measurement of multi degrees of freedom of motion at one time and with high precision. In order to measure the position and the direction of at least one of the mold halves instantly and accurately, it is recommendable that a plurality of sensors are set at predetermined locations.

With regard to the device for calculating the relative position between the key and the key guide and the relative position between the plunger and the bottom mold based on the measured movable range, e.g. analogue electronic circuits, digital electronic circuits, sequencers, and computer software can be used. In particular, the computer software or the sequencer is preferable because a program can be modified to be adopted for various kind of molds.

Positioning the mold is normally carried out by use of electric motors, hydraulic actuators or the like. When the calculation of the relative position between the plunger and the bottom mold shows that the position of the plunger is deviated with respect to the bottom mold, such positioning means is activated to move the plunger with respect to the bottom mold so as to correct the deviation, thereby adjusting the position of the plunger. The movable range of the plunger is necessarily limited to the range of the clearance between the key and the key guide because the key and the key guide for positional alignment of the mold are in engagement with each other at that time.

In order to industrially put the invention into practice, it is preferable to use a system wherein a power source for positioning the mold and a power source for giving the shaking force to the mold are in common, and the means for measuring the movable range of the plunger has an output fed back to a controller for the power source. An example of such a system is one wherein the position of the plunger is measured by non-contact displacement sensors, each sensor has an output fed back to electric current value of the electromagnet in a shaking apparatus to carry out servo-control.

According to another mode of the present invention, there is provided a method for automatically positioning a mold based on an error in size of a product which has been pressed by a pair of mold halves (i.e. a plunger and a bottom mold). This method is based on the facts that if the mold halves are in improper engagement, products formed by the mold halves are continuously subjected to similar errors in size. The method comprises measuring errors in size of the products which have been formed by the mold halves, calculating based on the measurement a relative positional deviation which is inherent in the mold halves, and adjusting the relative position of the plunger and the bottom mold so as to cancel out the errors in size.

Now, the present invention may be described in detail with reference to preferred embodiments in the accompanying drawings. The present invention is not limited to the modes stated above, or the embodiments stated below. Many revisions may be made without departing from the scope of the invention.

Figure 2:
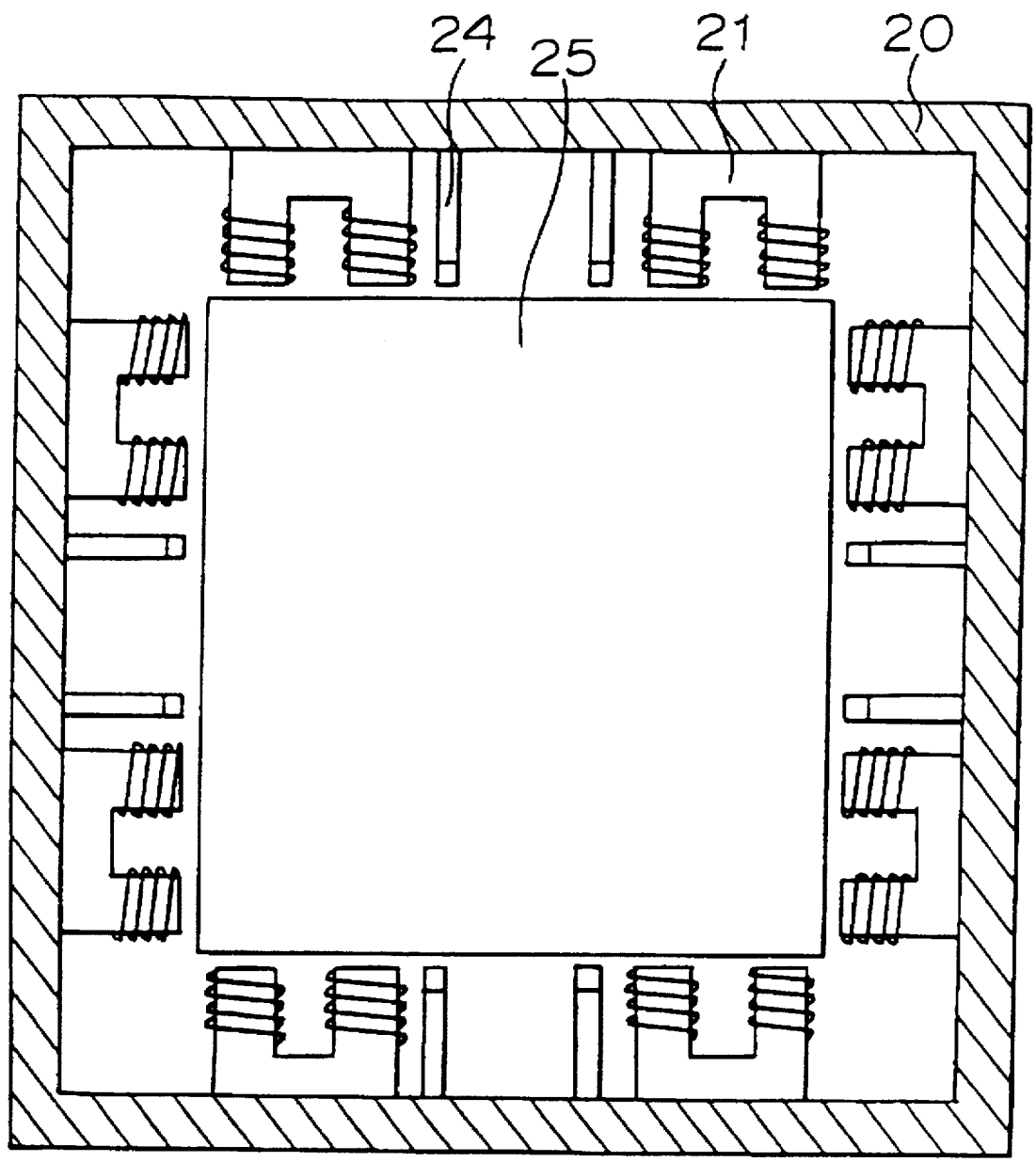
FIG. 2 is a sectional view taken along line A—A of FIG. 1.
Figure 3:
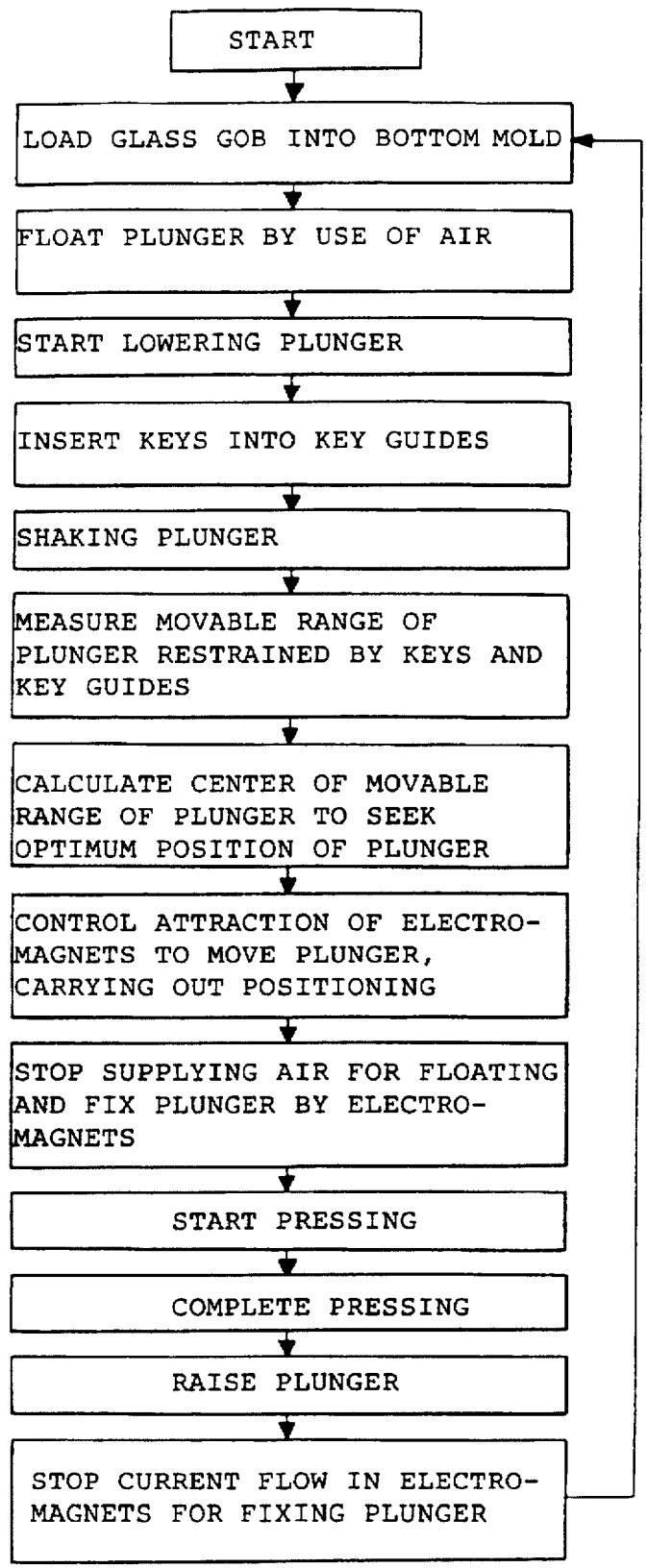
FIG. 3 is a flow chart showing a method for positioning a mold in accordance with the present invention.
Figure 4:
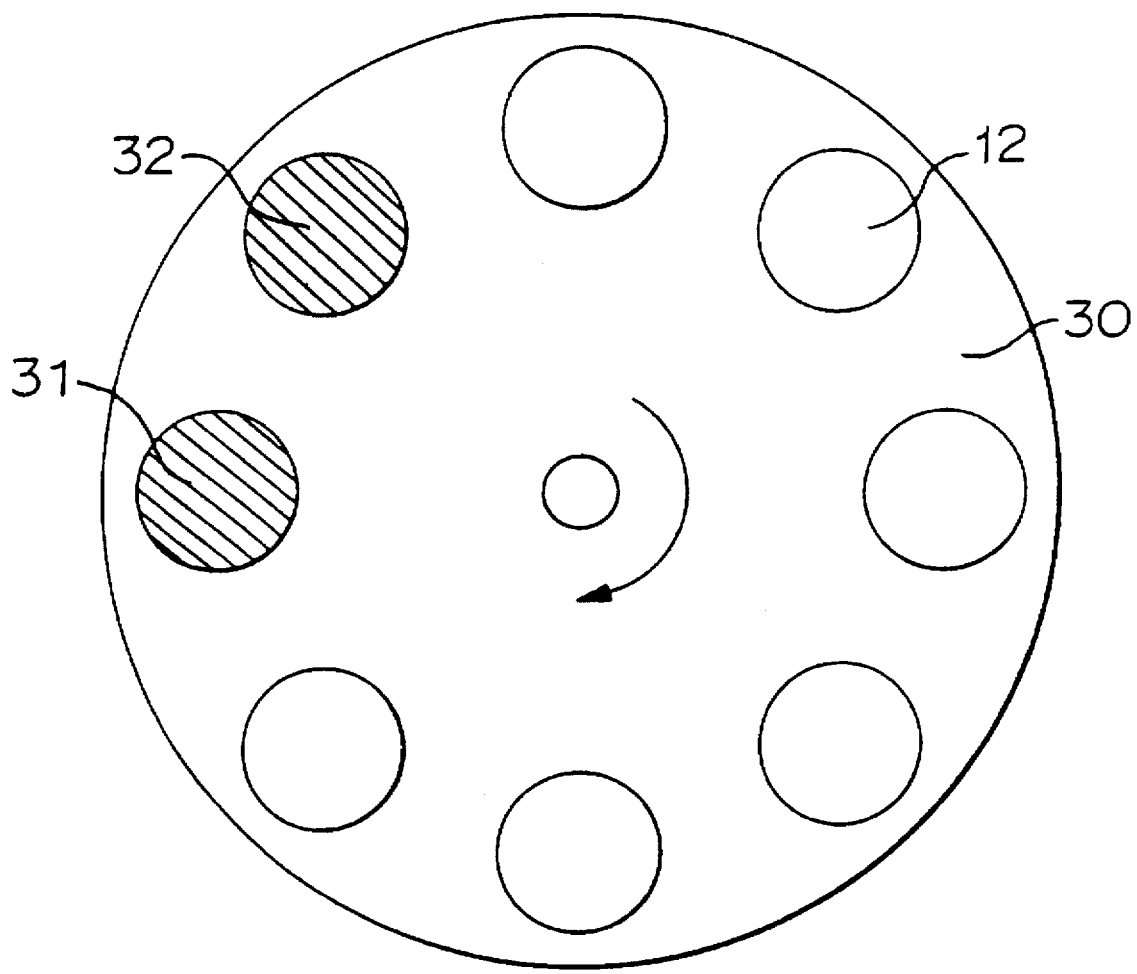
FIG. 4 is a plan view showing the layout of a conventional glass pressing process.
Figure 5:
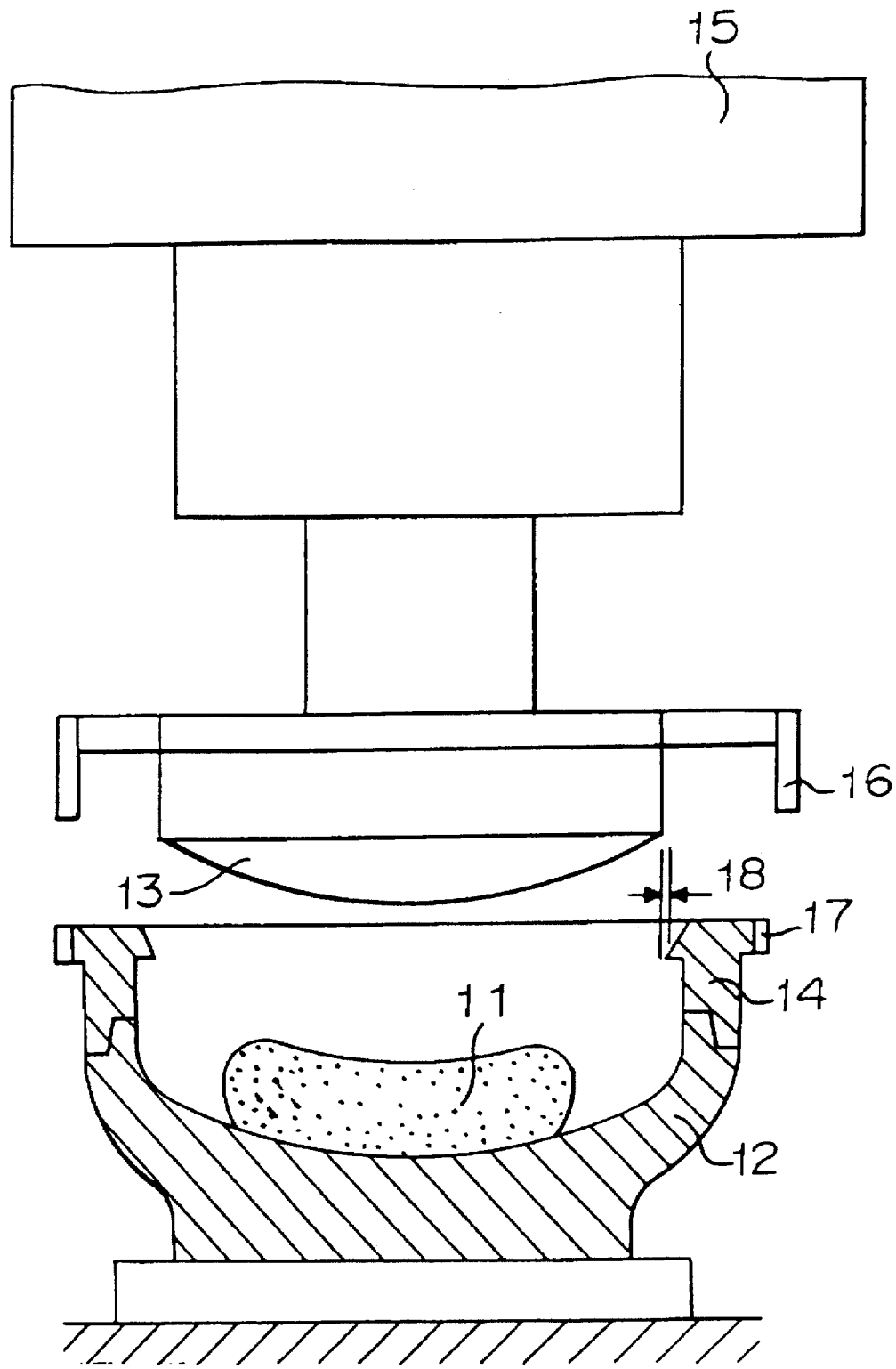
FIG. 5 is a sectional side elevation of a conventional pressing apparatus for glass.

In FIG. 1, there is shown a sectional side elevation of the basic structure of a positioning apparatus which is used in a glass pressing apparatus with a pair of mold halves (a plunger and a bottom mold) wherein a plunger works as movable-body. In FIG. 2, there is shown a sectional view taken along line A—A of FIG. 1. In FIG. 3, there is shown a flow chart showing a method for positioning the mold halves.

In FIG. 1, reference numeral 12 designates a bottom mold. Reference numeral 13 designates a plunger which presses a gob 11 loaded in the bottom mold. The bottom mold 12 is fixed on a rotational table 30. When the bottom mold comes to a predetermined position by rotating the rotation table, the plunger 13 is lowered to press the gob 11. The plunger 13 is connected to a movable-body 25 through a shaft 33. The movable-body 25 is in turn held by a housing 20 mounted to a lower end of a press machine 15, and is raised and lowered by the action of the press machine.

The movable-body 25 has a rectangular shape as shown in FIG. 2, and is supported by the housing 20 in a floating manner so as to be easily movable, being housed in the housing 20. In detail, the housing 20 has a lower portion and an upper portion provided with air-nozzles 22 and 23, respectively. Compressed air is blown from the air nozzles over the movable-body 25 to float the movable-body 25 in the housing 20. As a result, the plunger 13 coupled to the movable-body 25 in a single unit is also supported in a floating manner.

Eight electromagnets 21 are arranged to surround the movable-body as shown in FIG. 2. These electromagnets can move the movable-body 25 right and left, and back and forth, and rotate the movable-body about the vertical axis of the plunger 13 by controlling energization to the electromagnets. Specifically, since the electromagnets 21 are arranged around the movable-body 25, timing and strength for energization in the respective electromagnets can be controlled to adjust the movement of the movable-body 25, thereby to operate the electromagnets as a vibrator which moves the plunger 13 in the transverse direction or the horizontal direction as well as rotate it about the vertical axis.

The housing 20 has non-contact displacement sensors 24 provided thereon to measure the movement and the position of the plunger 13. Although it is not specified where to provide the sensors, it is normally preferable that more than one sensor are grouped and arranged around the shaft 33 with the plunger 13 attached thereto. The non-contact displacement sensors 24 jointly measure the movement and the position of the plunger 13 in the direction right and left, and back and forth as well as a rotational angle of the plunger around the vertical axis.

In order to be able to fix the movable-body 25 to the housing 20, electromagnets 26, for example four, are provided on an upper portion of the housing 20 below which the movable-body 25 is located. Although the electromagnets 26 are not active when supporting the movable-body 25 in the floating manner, the electromagnets can attract the movable-body 25 to the housing 20 to firmly fix it by their magnetic force due to energization.

The plunger 13 and the bottom mold 12 have keys 16 and key guides 17 provided thereon to align both mold halves. In the most typical type, the key guide 17 is formed so that the key guide has a groove vertically formed thereon, and the key 16 on the plunger is inserted into the groove when the plunger 13 is lowered. In order to stably align both mold halves, four pairs of the keys and the key guides are normally provided on the periphery of both mold halves, specifically the center of each side of the mold, which actually has a rectangular contour.

Now, the operation sequence of the pressing process including the mold alignment process will be described with reference to FIG. 3. First, a gob 11 is loaded into the bottom mold 12 while the plunger 13 remains raised as shown in FIG. 1. Air is injected from the air nozzles 22, 23 to float the movable-body 25 of the plunger 13 in the housing 20 by force of air. Next, the press machine 15 is activated to lower the plunger 13.

The keys 16 on the plunger 13 are inserted into the corresponding key guides 17 on the bottom mold 12 before the plunger comes in touch with the gob 11. At the same time as the keys 16 are inserted into the key guides 17, the electromagnets 21 are energized to attract the movable-body 25 by magnetic force, shaking the plunger 13 right and left, and back and forth in the horizontal direction. Since the plunger 13 is restrained with respect to the bottom mold 12 by the keys and the key guides at that shaking time, the allowable movable range of the plunger 13 by the shaking is limited to the clearance which is formed the keys and the key guides.

The non-contact displacement sensors measure the moving range of the plunger 13. Based on outputs from the sensors, a computer calculates a location $x_1$ (the center in the direction x right and left), $y_1$ (the center in the direction y back and forth) and $\theta_1$ (an angle about the vertical axis) of the plunger 13 which is located when the keys 16 are located at the center of the clearance given by the key guides 17. Positioning the plunger 13 is carried out by servo-controlling the magnetic force of the electromagnets 21 so as to position the plunger 13 at the location defined $x_1$, $y_1$ and $\theta_1$ while the outputs from the sensors 24 are fed back. Practically, the outputs from the sensors 24 can be fed back to the electromagnets 21 to automatically carry out positioning the plunger 13.

After completion of positioning, supplying air to the air nozzles 23 is stopped, and the electromagnets 26 are energized to fix the plunger 13 to the housing by magnetic force. Keeping such a state, the plunger 13 is lowered by the pressing machine 15 to press the gob 11. After completion of pressing the gob 11, the plunger 13 is raised by the press machine 15, and the value of the current in the electromagnets 26 gets to 0.

In accordance with the apparatus and the method stated just above, CRT panels were pressed. The range of variations in wall thickness size of CRT panels was reduced to less than 0.05 mm, and the production yield was drastically improved though the range of variations in thickness of CRT panels produced according to the conventional apparatus and method was not less than 0.2 mm.

Now, the case wherein positioning the plunger 13 is carried out based on errors in size of a product formed by the plunger and the bottom mold will be explained. When the product which has been pressed by both mold halves has an error in size which is inherent to the both mold halves, the plunger 13 is positioned with respect to the bottom mold 12 so as to correct the error.

Explaining this operation with reference to the flow chart of FIG. 3, the operation "calculates center of movable range of plunger to seek optimum position of plunger" is displaced by an operation "seek position of plunger so as to correct error in size of product pressed in the past". In other words, it is sufficient to indicate an error in size of an actual product instead of indicating the center position of the movable range of the plunger which is sought by moving the plunger and making calculation based on the measured movable range. Such operation can be easily attained by a computer for control. According to this method, the range of variations in thickness of CRT panels was able to be reduced to less than 0.1 mm.

In accordance with the present invention, at least one of the mold halves is moved in the clearance between the key and the key guide provided on the mold halves for alignment, and the positional deviation between both mold halves is calculated based on the movable range of the at least one of the mold halves, or an error in size of a pressed product is measured. A relative position of the plunger and the bottom mold is adjusted so as to correct the positional deviation or the error in size. As a result, the present invention offers advantages in that dimension precision of pressed products is improved and production yield is also improved, in comparison with the conventional pressing apparatus.

In particular, the method wherein the positional deviation is calculated by moving at least one of the mold halves while keeping the key and the key guide in engagement, and positioning the at least the one of the mold halves is adjusted based on the calculated positional deviation is more preferable because adjustment is made at each pressing and there is no adverse effect due to lapse of time.

Obviously, numerous modifications and variations of the present invention are possible in light of the above teachings. It is therefore to be understood that within the scope of the appended claims, the invention may be practiced otherwise than as specifically described herein.

What is claimed is:

1. A mold positioning apparatus which is used in a pressing apparatus for pressing a work by a plunger and a bottom mold, comprising:

keys and key guides which are provided on a plunger and a bottom mold, and which are engaged together to restrict a relative position between the plunger and the bottom mold;

means for shaking at least one of the plunger and the bottom mold in clearance between the key and the key guide while keeping the key and the key guide in engagement;

means for measuring a movable range of the at least one of the plunger and the bottom mold during the shaking;

a device for calculating a relative position between the key and the key guide and the relative position between the plunger and the bottom mold based on the measured movable range; and means for adjusting the plunger and the bottom mold in a range of the clearance of the key and the key guide based on the calculation to carry out positioning therebetween.

2. A mold positioning apparatus according to claim 1, wherein the shaking means and the adjusting and positioning means are constructed so that at least one of the plunger and the bottom mold is moved by magnetic force from an electromagnet.

3. A method for positioning a mold, comprising: providing a key and a key guide on a pair of mold halves to align the mold halves, the mold halves pressing a work;

engaging the key and the key guide;

shaking at least one of the mold halves to move the at least one of mold halves in clearance between the key and the key guide, thereby measuring a movable range of the at least one mold half;

calculating an error in a relative position between the mold halves based on the results of the measurement; and adjusting the mold halves so as to correct the error, thereby carrying out positioning between the mold halves.

4. A method according to claim 3, further comprising:

supporting the at least one of the mold halves by air or magnetic force in such a state that friction resistance is minimized; and moving the at least one of the mold halves by magnetic force from an electromagnet to shake the at least one of mold halves, thereby carrying out positioning between the mold halves.

5. A method for positioning a mold, comprising:

measuring an error in size of a product pressed by a plunger and a bottom mold, which have a key and a key guide provided thereon for positional alignment;

estimating, based on the measurement, to what extent the plunger and the bottom mold are deviated; and adjusting a relative position between the plunger and the bottom mold so as to correct the error in clearance between the key and the key guide.

* * * * *